United States Patent [19]
Takano et al.

[11] Patent Number: 5,955,819
[45] Date of Patent: Sep. 21, 1999

[54] STANDING-WAVE VIBRATION MOTOR

[75] Inventors: Hironori Takano; Hiroshi Yamamoto, both of Yokohana; Masami Sugimori, Yamato, all of Japan

[73] Assignee: Canon Kabushiki Kaisha, Tokyo, Japan

[21] Appl. No.: 08/855,607

[22] Filed: May 13, 1997

[30] Foreign Application Priority Data

| May 15, 1996 | [JP] | Japan | 8-120225 |
| Jun. 5, 1996 | [JP] | Japan | 8-142804 |

[51] Int. Cl.⁶ .................................................. H01L 41/08
[52] U.S. Cl. .......................... 310/316; 310/317; 310/323
[58] Field of Search ................................... 310/316, 317, 310/323, 328; 318/116

[56] References Cited

U.S. PATENT DOCUMENTS

| 4,504,760 | 3/1985 | Yamamoto et al. | 310/323 |
| 4,954,741 | 9/1990 | Furutsu et al. | 310/316 |
| 5,162,708 | 11/1992 | Naito et al. | 310/316 X |
| 5,359,268 | 10/1994 | Kashiyama | 318/116 |
| 5,453,653 | 9/1995 | Zumeris | 310/323 |
| 5,457,362 | 10/1995 | Bitzer et al. | 310/316 X |
| 5,461,273 | 10/1995 | Kawasaki et al. | 310/316 |
| 5,477,099 | 12/1995 | Suganuma | 310/316 |
| 5,495,152 | 2/1996 | Fukui | 318/116 |
| 5,500,578 | 3/1996 | Kawamura | 310/316 X |
| 5,616,979 | 4/1997 | Nishikawa | 310/316 |
| 5,640,063 | 6/1997 | Zumeris et al. | 310/317 X |
| 5,640,065 | 6/1997 | Abe et al. | 310/317 |
| 5,672,930 | 9/1997 | Narisawa et al. | 310/323 |

*Primary Examiner*—Mark O. Budd
*Attorney, Agent, or Firm*—Fitzpatrick, Cella, Harper & Scinto

[57] ABSTRACT

A highly-efficient standing-wave vibration motor is disclosed in which the rotating direction can be maintained when the driving frequency is in the vicinity of the resonant frequencies. Driving signals are applied to the motor via an inductance element. The inductance of the element is determined so that the phase difference between a phase of a bending vibration and a phase of a longitudinal vibration with respect to currents in relation to the respective driving voltages does not exceed $\pi$.

13 Claims, 16 Drawing Sheets

STANDING-WAVE VIBRATION MOTOR

BACKGROUND OF THE INVENTION

1. Field of the Invention

The present invention relates generally to a standing-wave vibration motor which obtains a driving force by virtue of standing waves. More particularly, the invention relates to a drive circuit of the above type of vibration motor.

2. Related Background Art

A traveling-wave vibration motor which is becoming a focus of attention has the well-known advantages of facilitating low-speed driving and obtaining a high torque, and is already commercially available in the field of optical equipment.

In this type of vibration motor, it is necessary to apply a voltage of approximately several dozens to several hundreds volts to a piezoelectric vibrator. Accordingly, the applied voltage is increased by using an inductance element, such as a coil, and the increased voltage is used as a driving voltage. Although this method is primarily employed only for a traveling-wave vibration motor, it may also be employed for a standing-wave vibration motor in order to increase the applied voltage. Through intense study by the present inventor, however, it has been proved that a new effect, as well as an increase in the applied voltage, can be exhibited by the above method depending on the selection of an inductance element, such as a coil.

Such an effect will now be explained while referring to an example of conventional standing-wave vibration motors.

Hitherto, as a vibration motor utilizing standing-wave vibration, a vibration motor using standing waves generated in an elastic member is known. In this type of motor, voltages of a specific frequency are applied to a vibration device integrally provided with an elastic member so as to excite a bending vibration and a longitudinal vibration in the elastic member. As a result, a driving force can be obtained via an elliptic-rotation extracting member provided on the elastic member or the vibration device.

A brief explanation will now be given of the principle of driving a standing-wave vibration motor with reference to FIG. 7. In FIG. 7, there are shown an elastic member 71 formed of an elastic member, and piezoelectric vibrators 72a and 72b as electro-mechanical energy conversion element ports for exciting a longitudinal vibration and a bending vibration in the elastic member 71. The directions in which the vibrators 72a and 72b are polarized are indicated by the arrows shown in FIG. 7. There are also shown elliptic-rotation extracting members 73a and 73b integrally provided on the elastic member 71, electrodes 74a, 74b, 74c and 74d for applying specific-frequency voltages to the piezoelectric vibrators 72a and 72b, and a mobile unit 75. An urging spring 76 is also provided to urge the mobile unit 75 against the elliptic-rotation extracting members 73a and 73b at a predetermined force. A bearing 77 serves to reduce a frictional force between the urging spring 76 and the mobile unit 75 generated due to an urging force exerted by the spring 76.

In the standing-wave vibration motor constructed as described above, upon application of specific-frequency voltages which are 90° out of phase with each other (designated by sin and cos, respectively, in FIG. 7) to the electrodes 74a and 74d and the electrodes 74b and 74c, respectively, the piezoelectric vibrators 72a and 72b repeatedly expand and contract at the respective drive frequencies. This excites a longitudinal vibration and a bending vibration in the elastic member 71, and both vibrations are combined into a synthetic vibration, thereby further inducing the elliptic-rotation extracting members 73a and 73b to rotate in an elliptic motion in the same direction. Then, the urging spring 76 urges the mobile unit 75 to contact the rotation-extracting members 73a and 73b, thereby shifting the mobile unit 75 in the respective directions, for example, indicated by the two headed arrow in FIG. 7.

Although in the example shown in FIG. 7, the bending vibration and the longitudinal vibration are respectively determined to be a fourth-order vibration and a first-order vibration, this is not exclusive. Any vibration mode may be employed as long as a driving force can be obtained.

In the standing-wave vibration motor, two vibration modes (the bending vibration and the longitudinal vibration, in this example) are simultaneously caused to resonate at certain drive frequencies, as noted above. Thus, the vibration motor should be shaped so that the resonant frequencies of the two vibration modes substantially coincide with each other.

Although the vibration motor can be shaped with high precision by machining, it is very difficult to substantially match the resonant frequencies of the two vibration modes, as illustrated in FIG. 9, due to anisotropic characteristics inherent in the materials for the motor, variations in the thickness of the adhesive used for joining the elastic member and the piezoelectric vibration devices, and variations in the hardness of the adhesive after it has been cured caused by differences in curing conditions. FIG. 8 illustrates an equivalent circuit of the standing-wave vibration motor shown in FIG. 7. FIG. 9 illustrates the absolute value |Y| of the admittance characteristics of the equivalent circuit. In FIG. 9, reference numeral 91 indicates the absolute value $|Y_1|$ of the bending vibration, while 92 designates the absolute value $|Y_2|$ of the longitudinal vibration. The absolute value $|Y_1|$ of the bending vibration is maximized at a frequency $f_1$, while the absolute value $|Y_2|$ of the longitudinal vibration is maximized at a frequency $f_2$.

FIG. 10 illustrates the phase characteristics of the equivalent circuit shown in FIG. 8 with respect to currents in relation to the driving voltages. In FIG. 10, 93 represents phase characteristics $\theta_1(f)$ of the bending vibration, while 94 depicts phase characteristics $\theta_2(f)$ of the longitudinal vibration. In the standing-wave vibration motor having the above resonance characteristics, a current phase difference $d\theta(f)$ 95 ($\theta_1(f)-\theta_2(f)$) between the phase $\theta_1(f)$ 93 of the bending vibration and the phase $\theta_2(f)$ 94 of the longitudinal vibration with respect to currents in relation to the driving voltages exceeds 180 degrees, as illustrated in FIG. 11, between the two resonant frequencies. It should be noted that FIG. 11 illustrates the actual phase characteristics of a vibration motor obtained by phase-shifting the characteristics of the equivalent circuit shown in FIG. 10 by 90 degrees after considering that there is a 90° phase difference between the bending vibration and the longitudinal vibration in a motor for practical use. As a consequence, there is generated a disparity in the direction in which the vibrator is rotated in an elliptic manner between the interval between the two resonant frequencies and frequency ranges other than the above interval. This disadvantageously narrows the frequency range in which a thrust (velocity) can be obtained to drive the motor, as shown in FIG. 12, and accordingly lowers the vibration efficiency.

SUMMARY OF THE INVENTION

Accordingly, it is an object of the present invention to provide a highly-efficient standing-wave vibration motor having a wider driving frequency range over a conventional standing-wave vibration motor, in which specific-frequency voltages are applied to vibrating devices integrally provided at an elastic member so as to excite a first vibration and a second vibration crossing the first vibration in the elastic member, and the synthetic vibration can be converted into a driving force via rotation-extracting members provided for the elastic member or the vibrating devices, wherein an inductance element is connected in series to drive electrodes for applying specific-frequency voltages to the vibrating devices, and the inductance is determined so that the phase difference $d\theta(f)$ between phases $\theta_1(f)$ and $\theta_2(f)$ of the respective vibration modes with respect to currents in relation to the driving voltages in an equivalent circuit of an ultrasonic motor falls within a predetermined range.

In order to achieve the above object, according to one aspect of the present invention, there is provided a vibration motor in which an electro-mechanical energy conversion element port is provided on an elastic member, and frequency signals are applied to the conversion element port to excite a first vibration and a second vibration crossing the first vibration in the elastic member, thereby obtaining a driving force from the synthetic vibration of the first and second vibrations, the vibration motor comprising an inductance element connected in series to electrodes for applying the frequency signals to the conversion element port, wherein the inductance of the inductance element is determined so that the phase difference $d\theta(f)$ between a phase $\theta_1(f)$ and a phase $\theta_2(f)$ of the respective first and second vibrations with respect to currents in relation to the driving voltages in an equivalent circuit of the vibration motor satisfies the condition of $-\pi/2<d\theta(f)<\pi/2$.

According to another aspect of the present invention, there is provided a vibration motor in which an electro-mechanical energy conversion element port is provided on an elastic member, and frequency signals are applied to the conversion element port to excite a first vibration and a second vibration crossing the first vibration in the elastic member, thereby obtaining a driving force from the synthetic vibration of the first and second vibrations, the vibration motor comprising an inductance element connected in series to electrodes for applying the frequency signals to the conversion element port, wherein the inductance of the inductance element is determined while considering the phase difference between the first and second vibrations of the vibration motor so that the phase difference $d\theta(f)$ between a phase $\theta_1(f)$ and a phase $\theta_2(f)$ of the respective first and second vibrations with respect to currents in relation to the driving voltages satisfies the condition of $+a-\pi/2<d\theta(f)<\pi/2+a$ (a indicates the phase difference between the first and second vibrations).

According to still another aspect of the present invention, there is provided a vibration motor in which an electro-mechanical energy conversion element port is provided on an elastic member, and frequency signals are applied to the conversion element port to excite a first vibration and a second vibration crossing the first vibration in the elastic member, thereby obtaining a driving force from the synthetic vibration of the first and second vibrations, the vibration motor comprising: an inductance element connected in series to electrodes for applying the frequency signals to the conversion element port; an adjustment circuit for adjusting frequencies in frequency ranges which are respectively positioned on a higher frequency side and a lower frequency side with respect to a frequency corresponding to the peak of a thrust obtained by synthesizing the first and second vibrations; a determination circuit for determining whether a present frequency is positioned in the higher-frequency range or the lower-frequency range with respect to the peak frequency, based on a direction in which the frequency of the frequency signal is changed and based on a thrust change caused by the frequency change; and a decision circuit for deciding, in accordance with the result determined by the determination circuit, a direction in which the frequency is to be shifted.

According to a further aspect of the present invention, there is provided a vibration motor in which an electro-mechanical energy conversion element port is provided on an elastic member, and frequency signals are applied to the conversion element port to excite a first vibration and a second vibration crossing the first vibration in the elastic member, thereby obtaining a driving force from the synthetic vibration of the first and second vibrations, the vibration motor comprising an inductance element connected in series to electrodes for applying the frequency signals to the conversion element port, wherein the inductance of the inductance element is determined so that the rotating direction in a frequency range higher than the frequency corresponding to a thrust peak of the driving force is the same as the rotating direction in a frequency range lower than the frequency corresponding to the thrust peak.

Further objects, features and advantages of the present invention will become apparent from the following description of the preferred embodiments with reference to the attached drawings.

DESCRIPTION OF THE PREFERRED EMBODIMENTS

A vibration motor according to the present invention will now be described with reference to the drawings.

Figure 1:
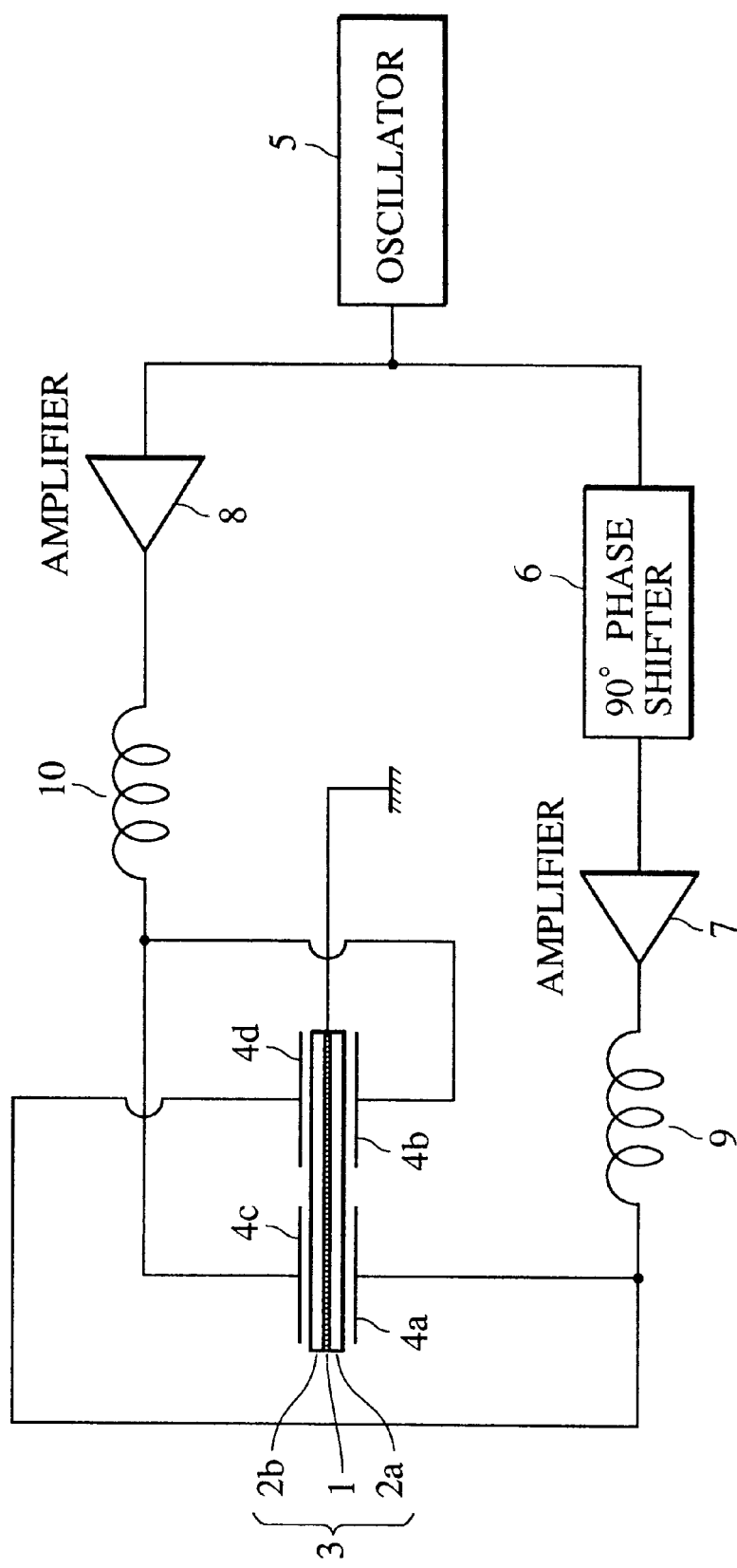
FIG. 1 is a schematic diagram of a standing-wave vibration motor according to an embodiment of the present invention.
Figure 7:
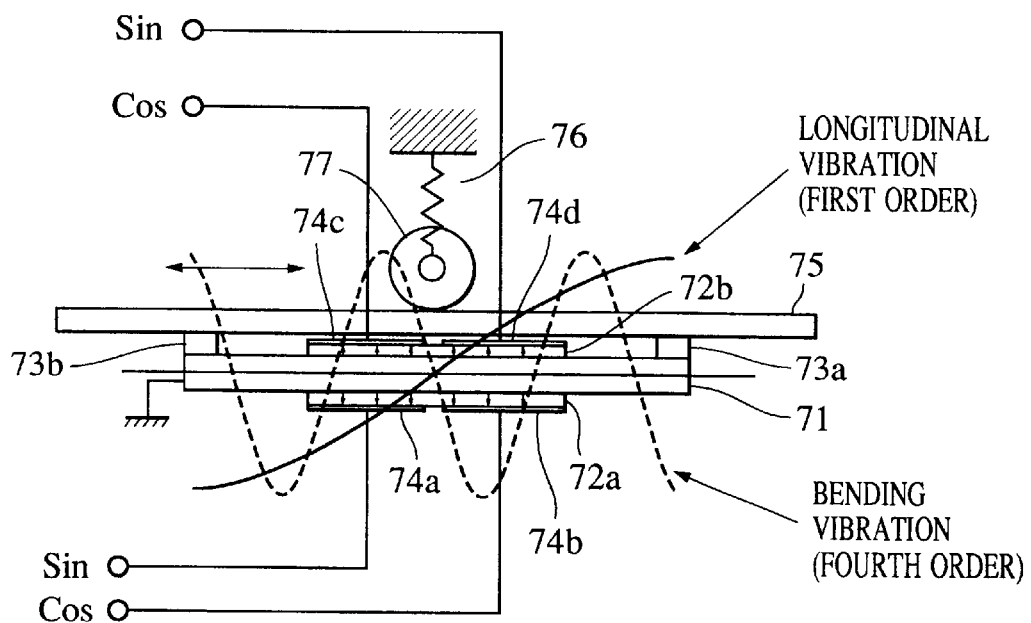
FIG. 7 illustrates the elements of a known standing-wave vibration motor.
Figure 8:
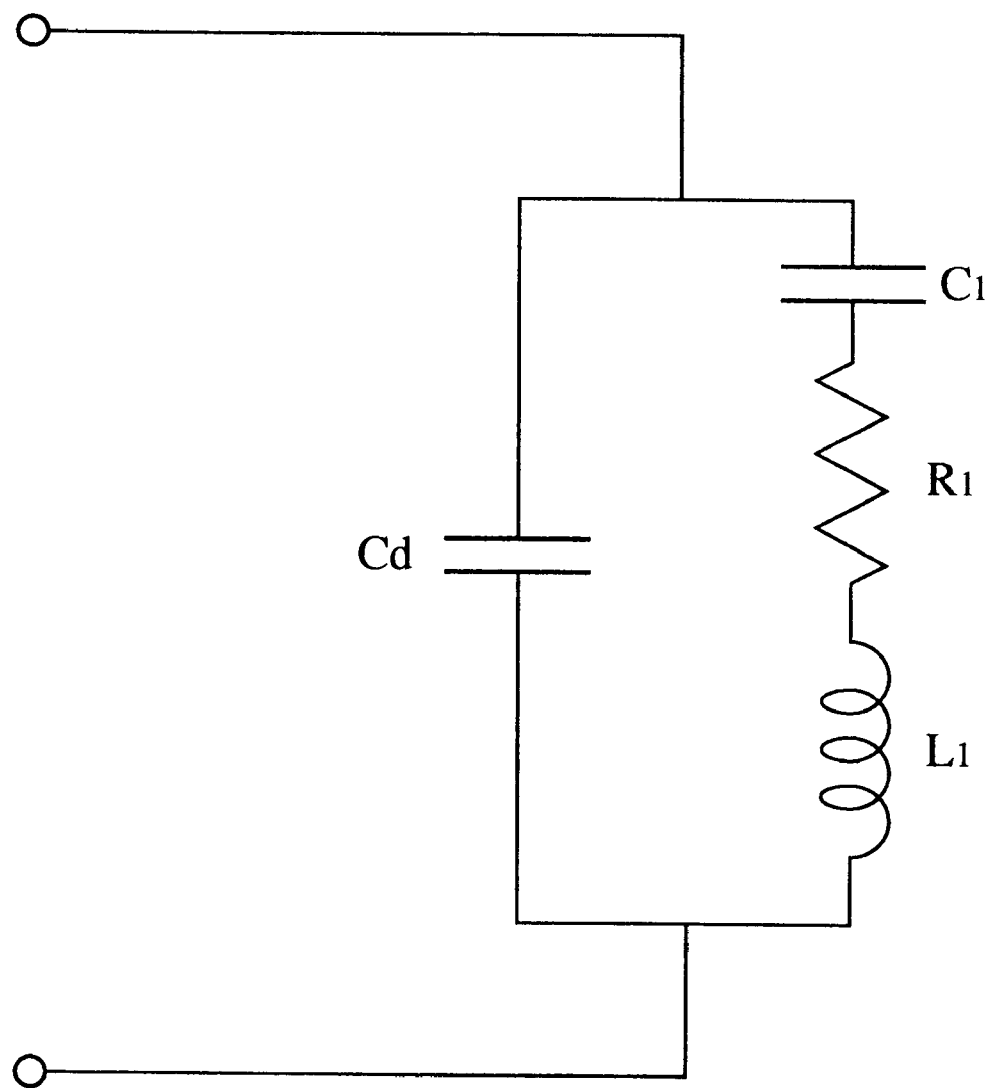
FIG. 8 is an equivalent circuit diagram illustrating one vibration mode used in a conventional standing-wave vibration motor.

Referring to a circuit diagram of a standing-wave vibration motor shown in FIG. 1, the motor includes an elastic member 1, and piezoelectric or electrostrictive vibrating devices 2a and 2b serving as electro-mechanical conversion element ports used for exciting a longitudinal vibration and a bending vibration in the elastic member 1. The vibrating devices 2a and 2b are polarized in the directions shown in FIG. 7. Electrodes 4a, 4b, 4c and 4d serve to apply specific-frequency voltages to the piezoelectric or electrostrictive vibrating devices 2a and 2b. The elastic member 1 and the piezoelectric or electrostrictive vibrating devices 2a and 2b are bonded to each other with an adhesive to form a vibrator 3. The vibration motor further includes an oscillator 5 for generating specific-frequency voltages, a 90°-phase shifter 6, and amplifiers 7 and 8. Further, this motor is a two-phase drive type as illustrated in FIG. 1, and there is no difference between a first phase 4a and 4d (electrodes) and a second phase 4b and 4c (electrodes), except that alternating voltages applied to the respective phases are ±90° out of phase.

Figure 2:
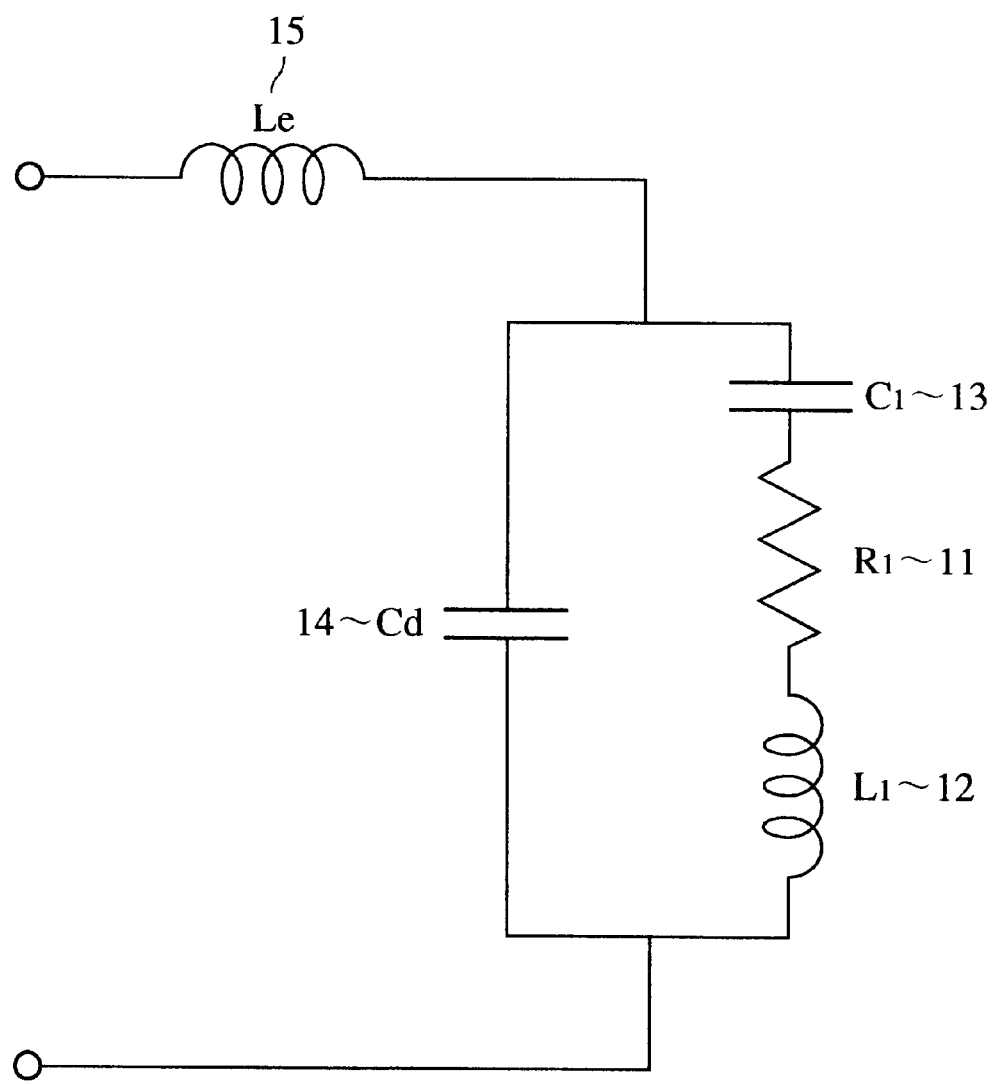
FIG. 2 is an equivalent circuit diagram illustrating one vibration mode used in a standing-wave vibration motor according to an embodiment of the present invention.

FIG. 2 is an equivalent circuit of the vibration motor illustrated in FIG. 1. This equivalent circuit is formed of an RLC series circuit (an equivalent resistor 11 having a resistance $R_1$, an equivalent coil 12 having a self-inductance $L_1$, and an equivalent capacitor 13 having a capacitance $C_1$), which forms a mechanical resonant portion, and a capacitor 14 equalling a damped capacitance $C_d$ of the vibrator 3 connected in parallel to the RLC series circuit. Moreover, an inductance element $L_e$ 15, such as a coil, is connected in series to the equivalent circuit of the motor. It should be noted that the RLC series circuit elements $R_1$, $L_1$ and $C_1$, which forms a mechanical resonant portion of the motor, in the equivalent circuit take different values depending on the vibration mode, i.e., the bending vibration or the longitudinal vibration.

The coil 15 is connected in series to the RLC series circuit in this manner, so that the peak frequency and the Q-factor of the admittance of the equivalent circuit can be made variable.

$$Y = \frac{1}{Z} = \frac{1}{\cfrac{1}{\cfrac{1}{\cfrac{1}{jwC_1} + jwL_1 + R_1} + jwC_d} + jwL_e} \quad (1)$$

Further, in an ultrasonic motor, the length, width, and thickness thereof are adjusted by means such as eigenvalue analysis in order to match the resonant frequency of the longitudinal vibration to that of the bending vibration. The resonant frequencies of both vibrations do not, however, necessarily coincide with each other due to dimensional errors or the state of adhesion. In order to overcome this drawback, in this invention, the inductance of the coil connected in series to the RLC circuit is selected as discussed below so as to reduce a disparity in the resonant frequency between the two different vibration modes.

Figure 3:
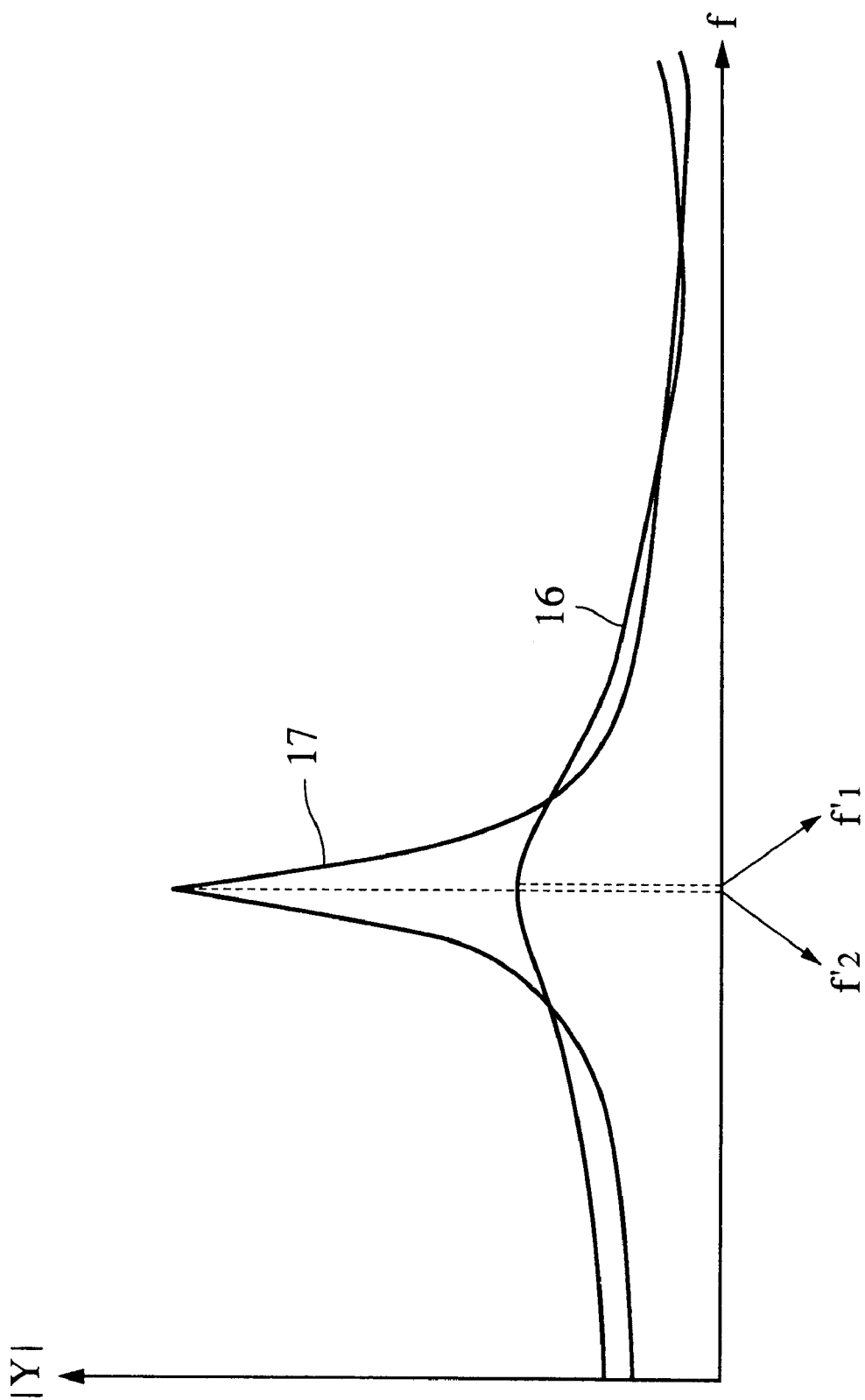
FIG. 3 illustrates the admittance characteristics of the standing-wave vibration motor shown in FIG. 2.
Figure 9:
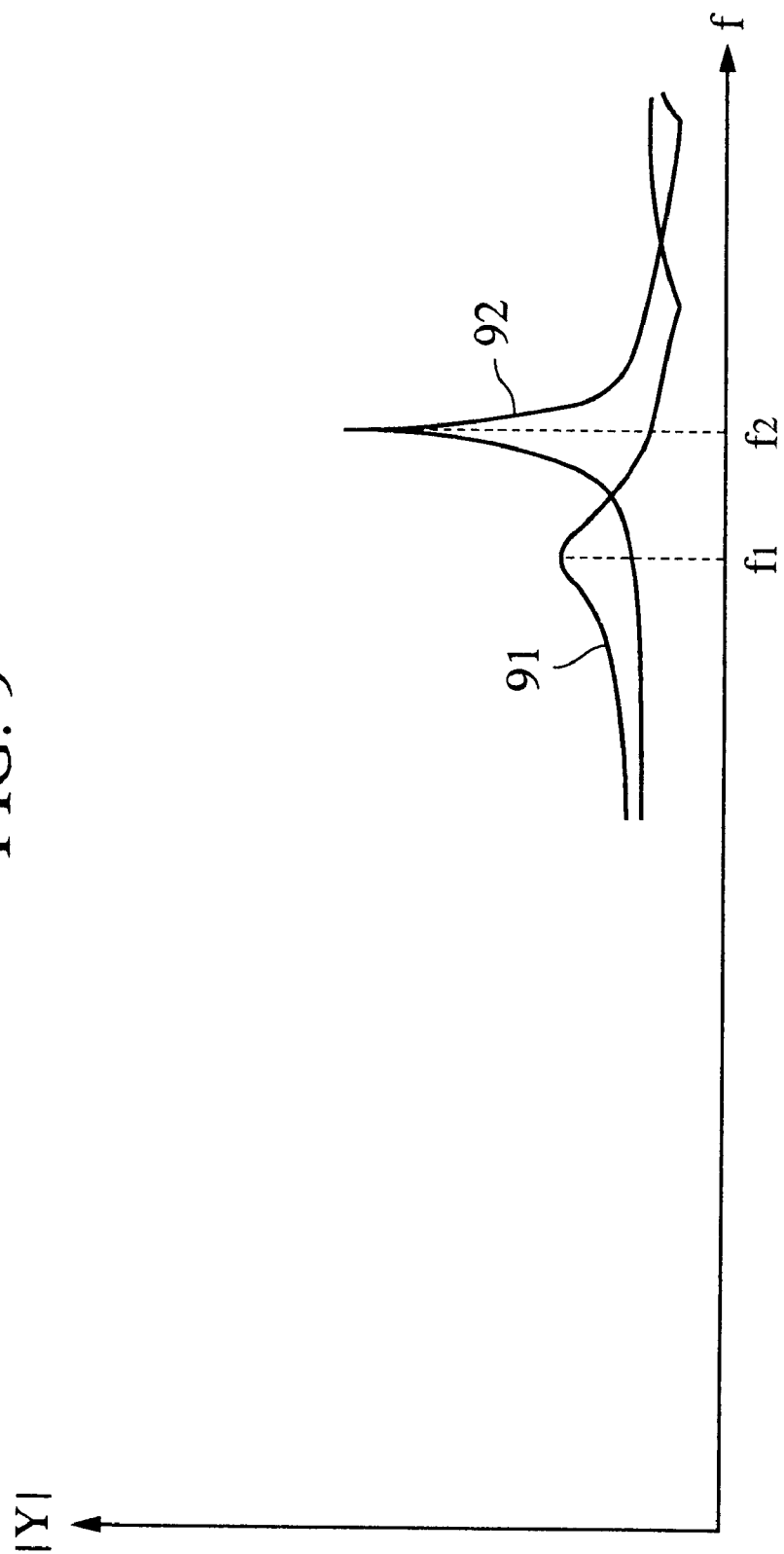
FIG. 9 illustrates the admittance characteristics of the standing-wave vibration motor shown in FIG. 8.
Figure 10:
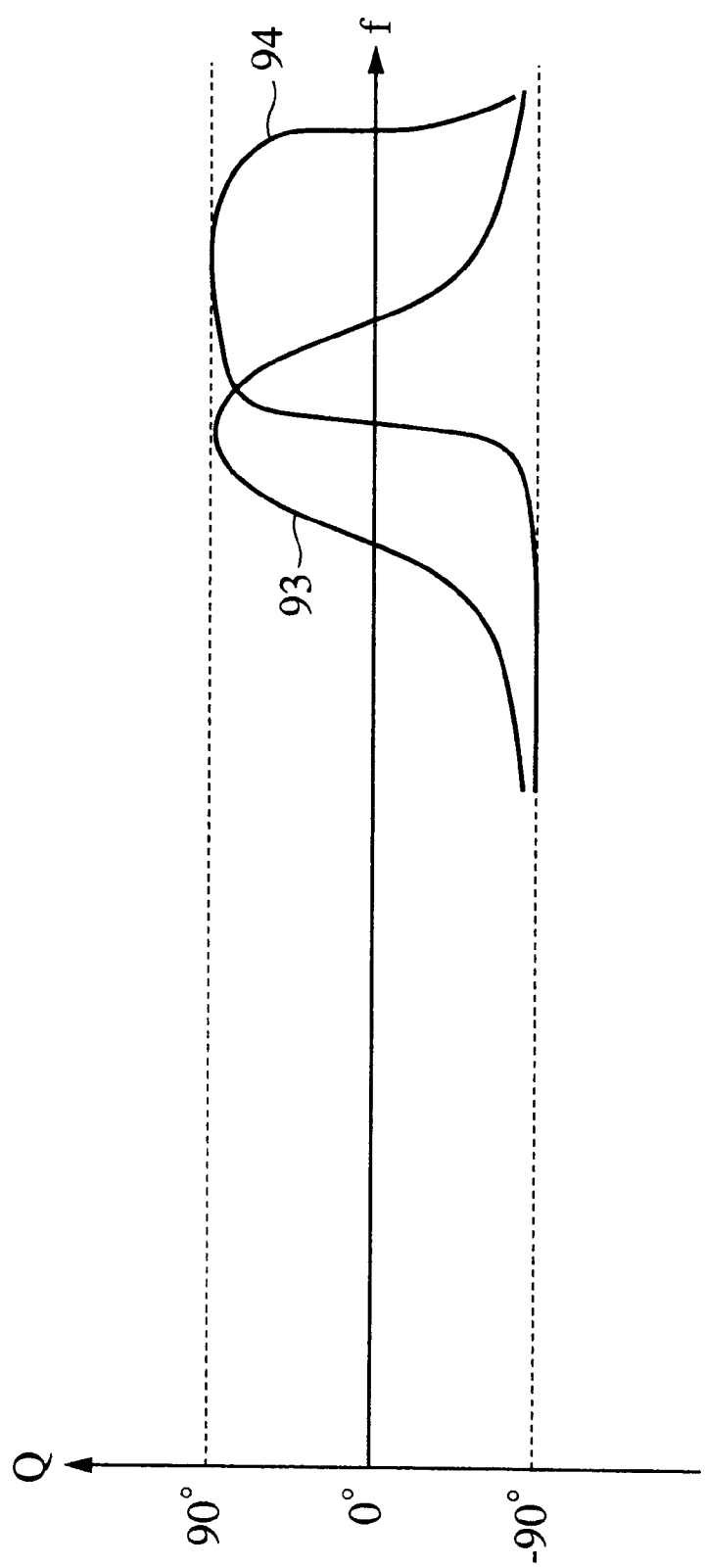
FIG. 10 illustrates the phase characteristics of the standing-wave vibration motor shown in FIG. 8.

FIG. 3 illustrates the absolute value |Y| of the admittance characteristics of the equivalent circuit of the vibration motor shown in FIG. 2. In FIG. 3, 16 indicates the absolute value $|Y_1|$ of the admittance of the bending vibration, while 17 represents the absolute value $|Y_2|$ of the admittance of the longitudinal vibration. The absolute value $|Y_1|$ of the admittance of the bending vibration is maximized at a frequency $f_1$, while the absolute value $|Y_2|$ of the admittance of the longitudinal vibration is maximized at a frequency $f_2$. Both peak frequencies are lower than the mechanical resonant frequencies shown in FIG. 9 because of the inductance $L_e$ connected in series to the vibration motor.

Figure 4:
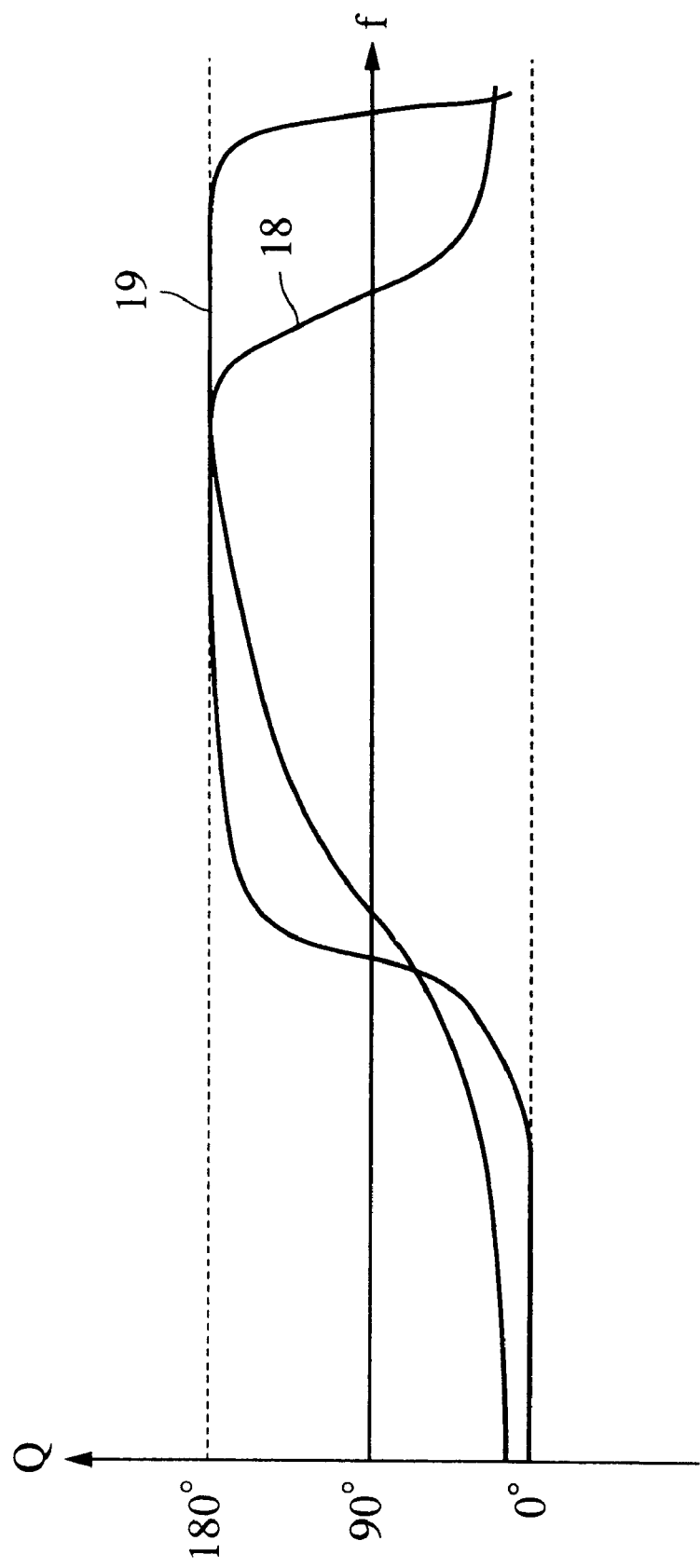
FIG. 4 illustrates the phase characteristics of the standing-wave vibration motor shown in FIG. 2.

FIG. 4 illustrates the phase characteristics of the equivalent circuit shown in FIG. 2 with respect to currents in relation to the driving voltages. In FIG. 4, 18 designates phase characteristics $\theta_1(f)$ of the bending vibration, while 19 depicts phase characteristics $\theta_2(f)$ of the longitudinal vibration.

Figure 5:
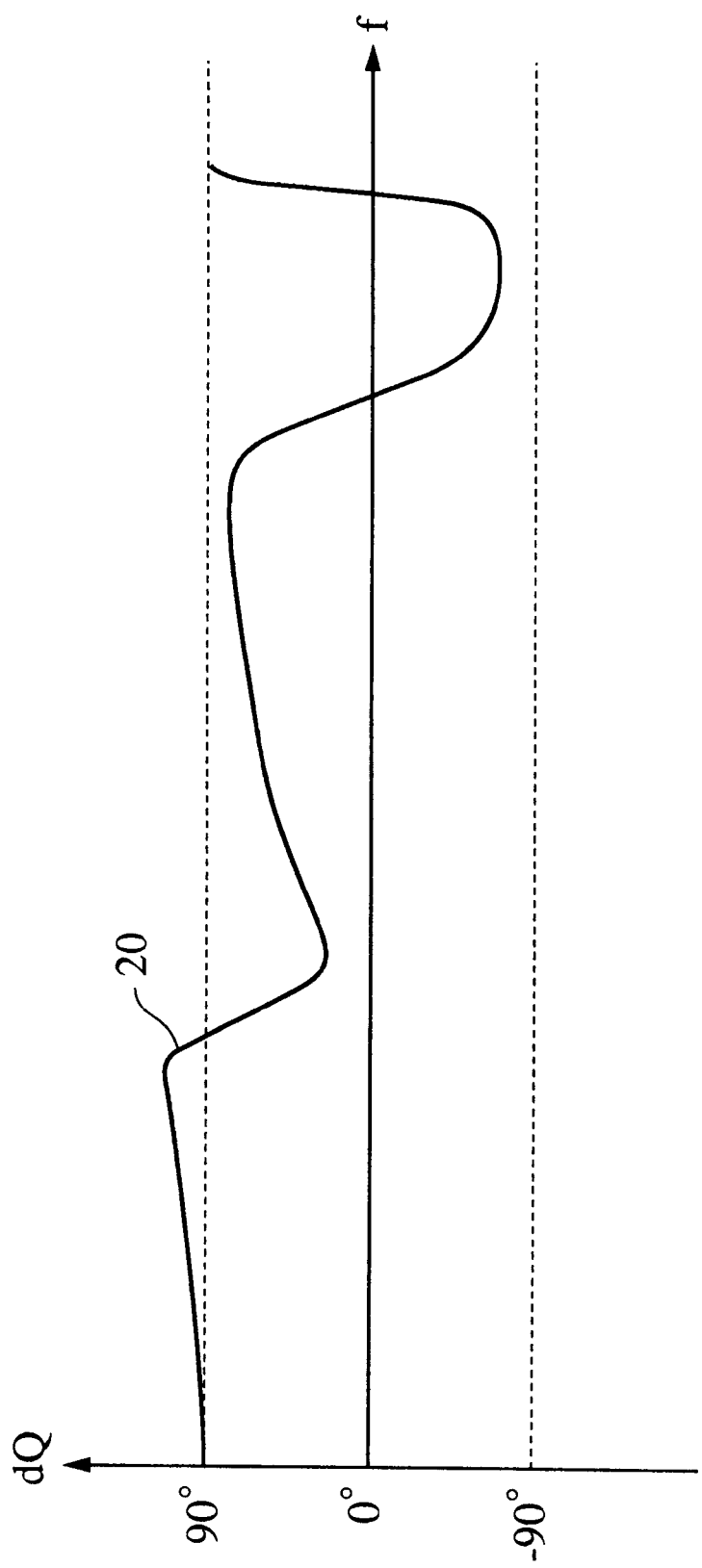
FIG. 5 illustrates the phase-difference characteristics of the standing-wave vibration motor shown in FIG. 2.
Figure 11:
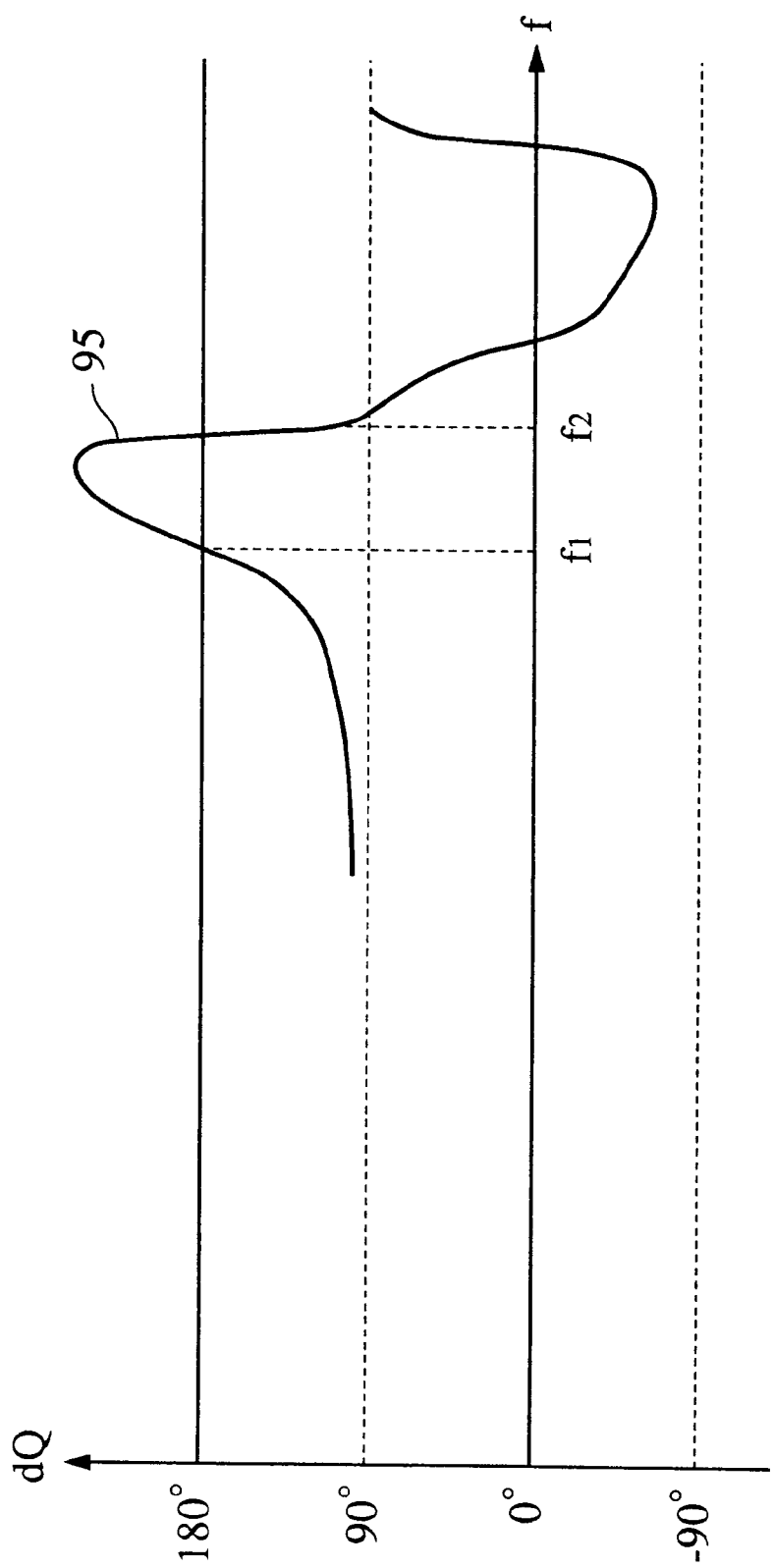
FIG. 11 illustrates the phase-difference characteristics of the standing-wave vibration motor shown in FIG. 8.
Figure 12:
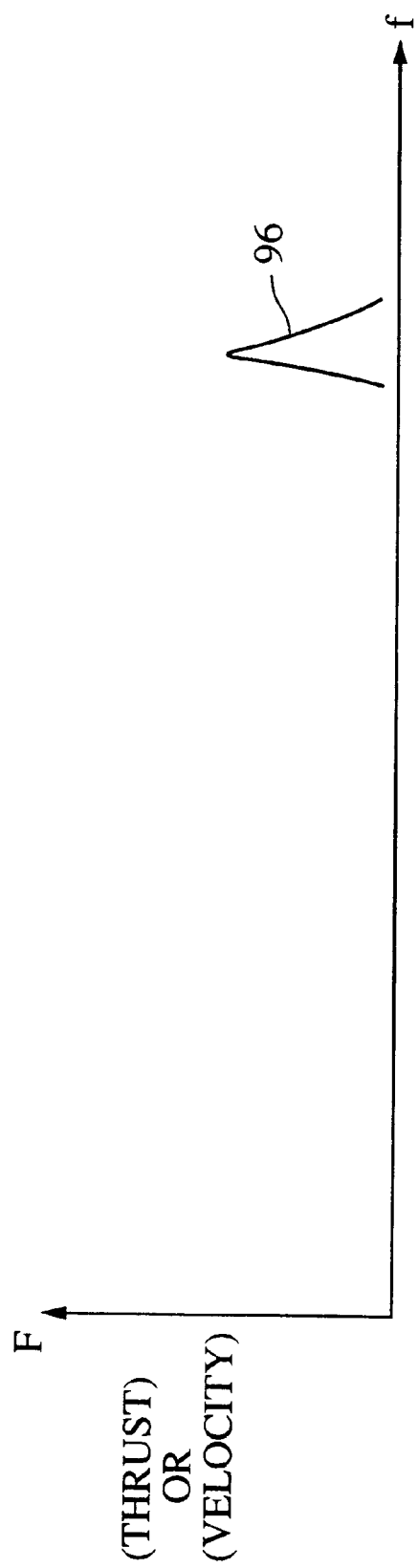
FIG. 12 illustrates the thrust characteristics of the standing-wave vibration motor shown in FIG. 8.

FIG. 5, as well as FIG. 11, illustrates a phase difference $d\theta(f)$ between the phase characteristics $\theta_1(f)$ of the bending vibration and the phase characteristics $\theta_2(f)$ of the longitudinal vibration while considering that the bending vibration is 90° out of phase with the longitudinal vibration in an actual vibration motor for practical use. In FIG. 5, 20 indicates a phase difference $d\theta(f)$. FIG. 5 shows that there is no frequency range in which the phase difference $d\theta(f)$ exceeds 180 degrees in the vicinity of the resonant frequencies of the respective vibrations. In general, the velocity of a mobile unit is proportional to the instantaneous values of the bending vibration and the longitudinal vibration of an elastic member, and the instantaneous values of the amplitudes of the bending vibration and the longitudinal vibration are proportional to a current flowing in a piezoelectric device used in a vibrator. Based on this idea, FIG. 5 shows that the direction in which the vibrator is rotated in an elliptic manner is unchanged at the resonant frequencies of the vibrations.

Figure 6:
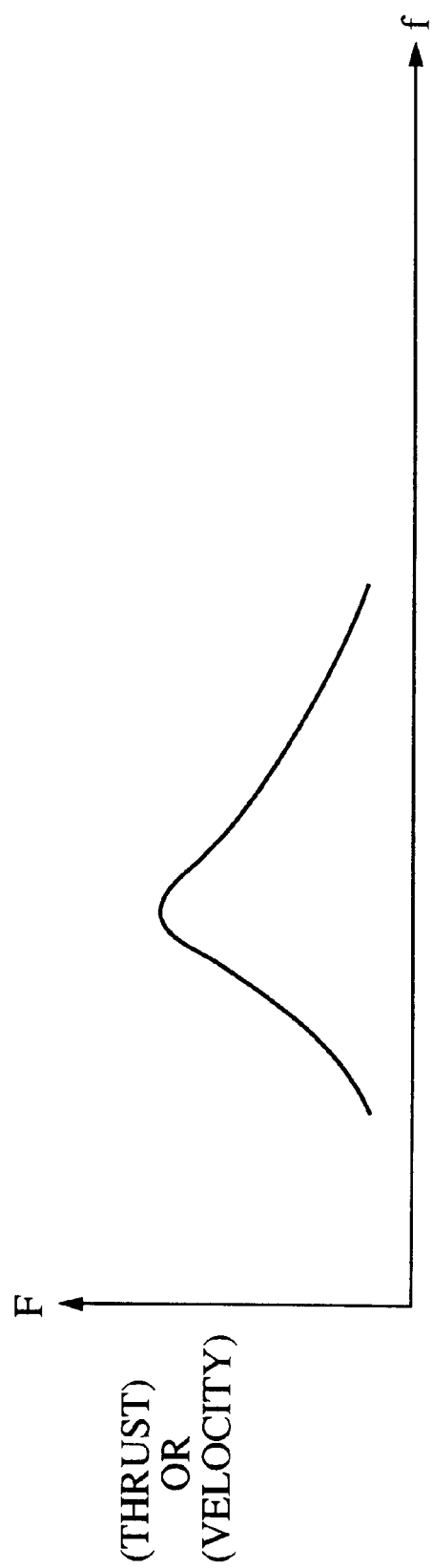
FIG. 6 illustrates the thrust characteristics of the standing-wave vibration motor shown in FIG. 2.

FIG. 6 illustrates the thrust (velocity) characteristics of the above-described vibration motor. Due to the inductance $L_e$ connected in series to the vibration motor, the driving voltage can be constant and the current is significantly increased in comparison with a conventional motor dispensing with the inductance $L_e$. Accordingly, the thrust can be remarkably elevated. Additionally, since the direction in which the vibrator is rotated in an elliptic manner at the resonant frequencies is unchanged, the following symptoms suffered by conventional ultrasonic motors can be inhibited: operation abruptly enters an unstable condition at a drive frequency lower than the resonant frequencies; or, in the worst case, operation is suddenly brought to a halt.

In this manner, the inductance $L_e$ is determined so that the phase difference $d\theta(f)$ between the bending vibration and the longitudinal vibration in the equivalent circuit of the afore-described motor is $-\pi/2 < d\theta(f) < \pi/2$. Accordingly, the direction in which the vibrator is rotated in an elliptic manner at the resonant frequencies can be kept unchanged. The above phase difference has been determined in terms of the equivalent circuit. There is, however, a 90° phase difference between the bending vibration and the longitudinal vibration in an actual motor for practical use. Taking this phase difference into consideration, the inductance $L_e$ is determined so that the phase difference $d\theta(f)$ is $0 < d\theta(f) < \pi$.

The reason why there is a 90° phase difference between the bending vibration and the longitudinal vibration in the above motor is that signals which are 90° out of phase with each other are applied to the electro-mechanical energy conversion element ports. If signals out of phase at phases other than 90 degrees are applied, the phase difference between the bending vibration and the longitudinal vibration corresponds to a phase other than 90°. In this case, the above phase difference dθ(f) should be set as +a−π/2<dθ(f)<π/2+a (a indicates the phase difference between the bending vibration and the longitudinal vibration).

In this embodiment, the vibration modes generated in the elastic member are set as the bending vibration and the longitudinal vibration. These are not, however, exclusive, and any vibration mode may be employed as long as a driving force can be obtained.

Figure 13:
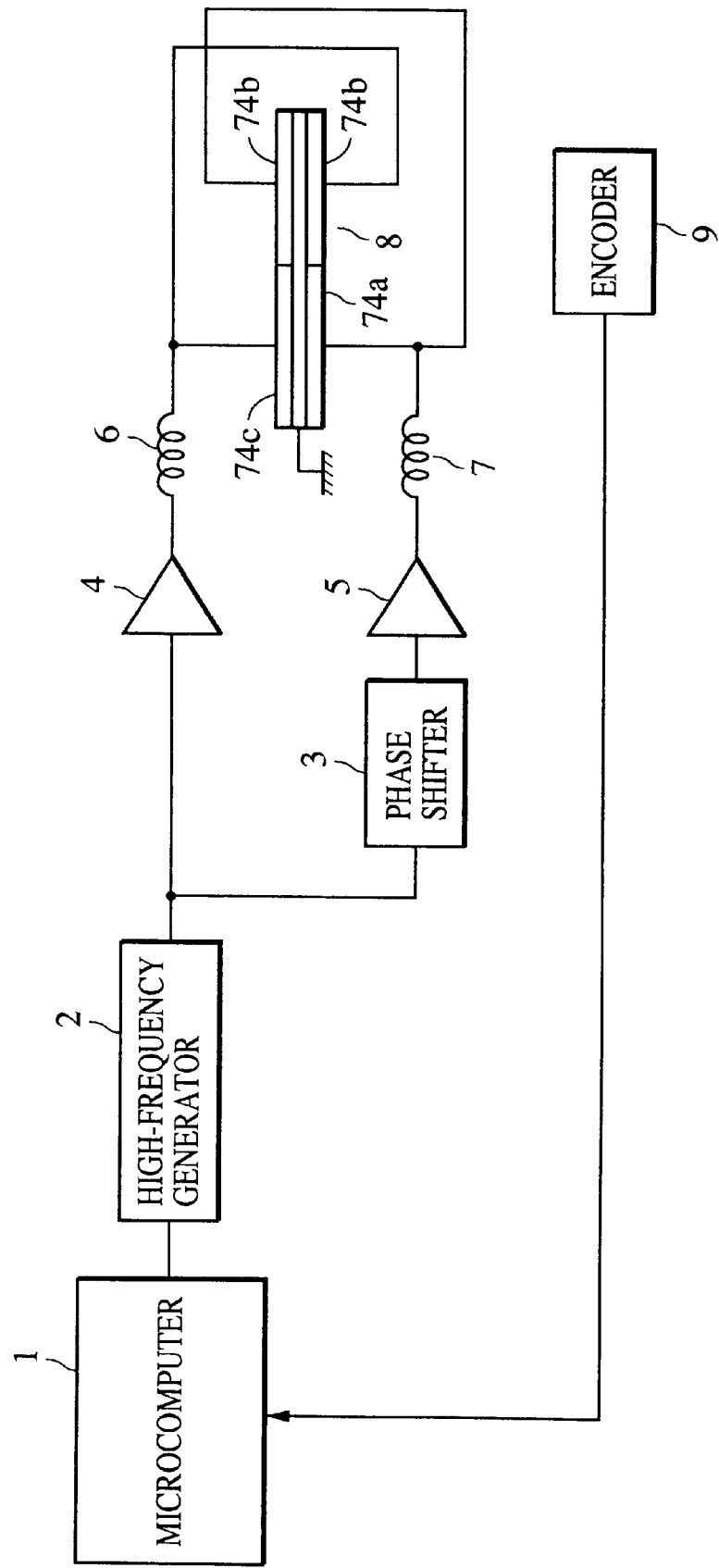
FIG. 13 is a block diagram illustrating the circuit configuration of a standing-wave vibration motor according to another embodiment of the present invention.

FIG. 13 is a block diagram of a vibration motor according to another embodiment of the present invention.

Referring to FIG. 13, a microcomputer 1, used as a control circuit, transmits to a high-frequency generator 2 a signal which instructs the generator 2 to generate high-frequency signals for driving the vibration motor. The high-frequency generator 2 then generates the high-frequency signals and sends them to an amplifier 4 and a phase shifter 3 which performs phase-shifting by 90 degrees. The phase shifter 3 then sends the 90°-phase-shifted signal to an amplifier 5, and the outputs of the amplifiers 4 and 5 are respectively input to electrodes 74b and 74c and electrodes 74a and 74d of a vibration motor 8 via coils 6 and 7 (whose inductances are determined to reduce a disparity in the resonant frequency as discussed above). Moreover, an encoder 9, functioning as positional detection means, measures the relative position between the motor and an object which moves relative to the motor due to a vibration force exerted by the motor. The encoder 9 transmits to the microcomputer 1 a signal corresponding to the measured position.

Figure 14:
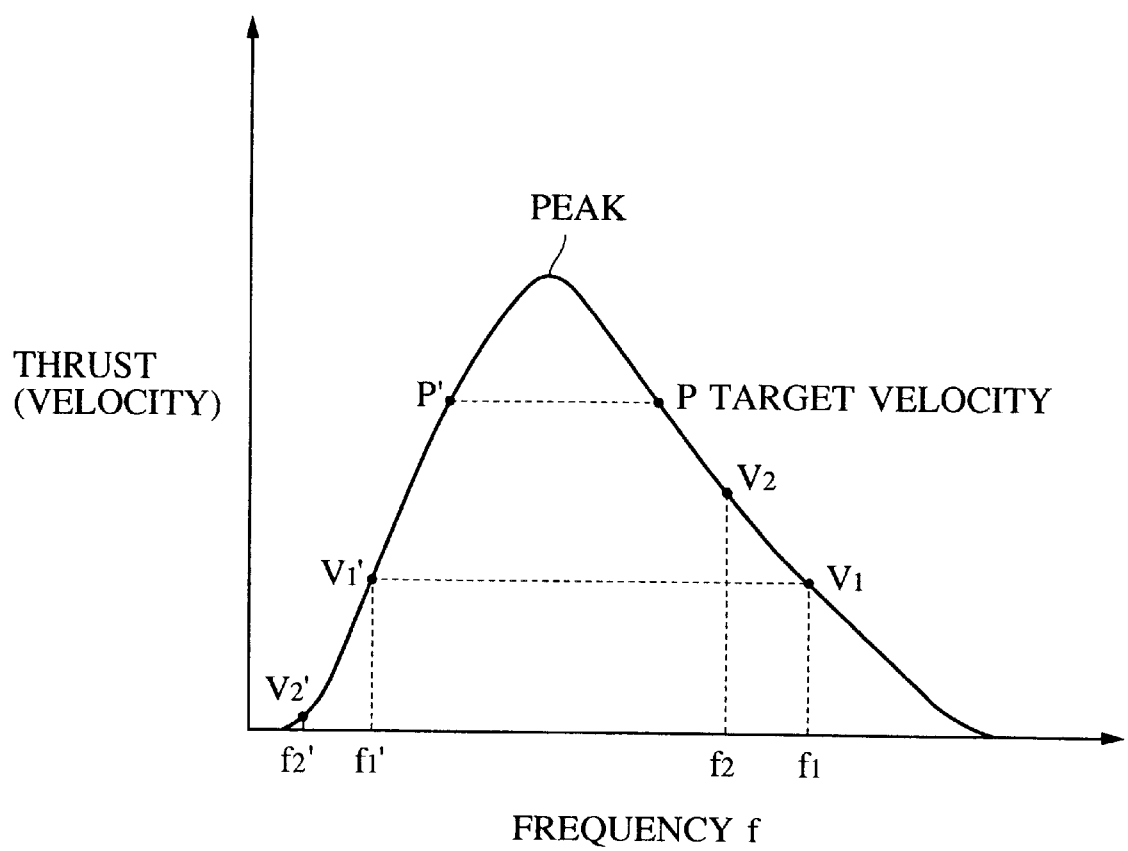
FIG. 14 is a characteristic diagram illustrating the operation of the standing-wave vibration motor shown in FIG. 13.

The relationship of the thrust (velocity) of the motor to the driving frequency is shown in FIG. 14.

It will now be assumed that the velocity is currently v1 in relation to a targeted velocity p when the frequency is f1. Supposing that the velocity is changed from v1 to v2 when the frequency is swept to f2, it has been validated that the motor is currently driven at a frequency higher than the frequency corresponding to the peak of the thrust (velocity) (hereinafter referred to as "on the higher-frequency side"), because the velocity was increased by lowering the frequency. It has also been verified that the frequency should be decreased to reach the targeted velocity.

Similarly, it will now be assumed that the velocity is v'1 when the frequency is f'1. Supposing that the velocity is changed from v'1 to v'2 when the frequency is swept by the same amount as the range in which the frequency was swept from f1 to f2, it is seen that the motor is currently driven at a frequency lower than the frequency associated with the peak of the thrust (velocity) (hereinafter referred to as "on the lower-frequency side"), because the velocity was decreased by lowering the frequency. It has also been proved that the frequency should be increased to reach the target velocity.

In this fashion, a predetermined frequency can be swept to judge the direction of change in the velocity of the motor. Thus, it can be determined whether the motor is driven on the higher-frequency side or the lower-frequency side with respect to the thrust (velocity) peak.

Figure 15:
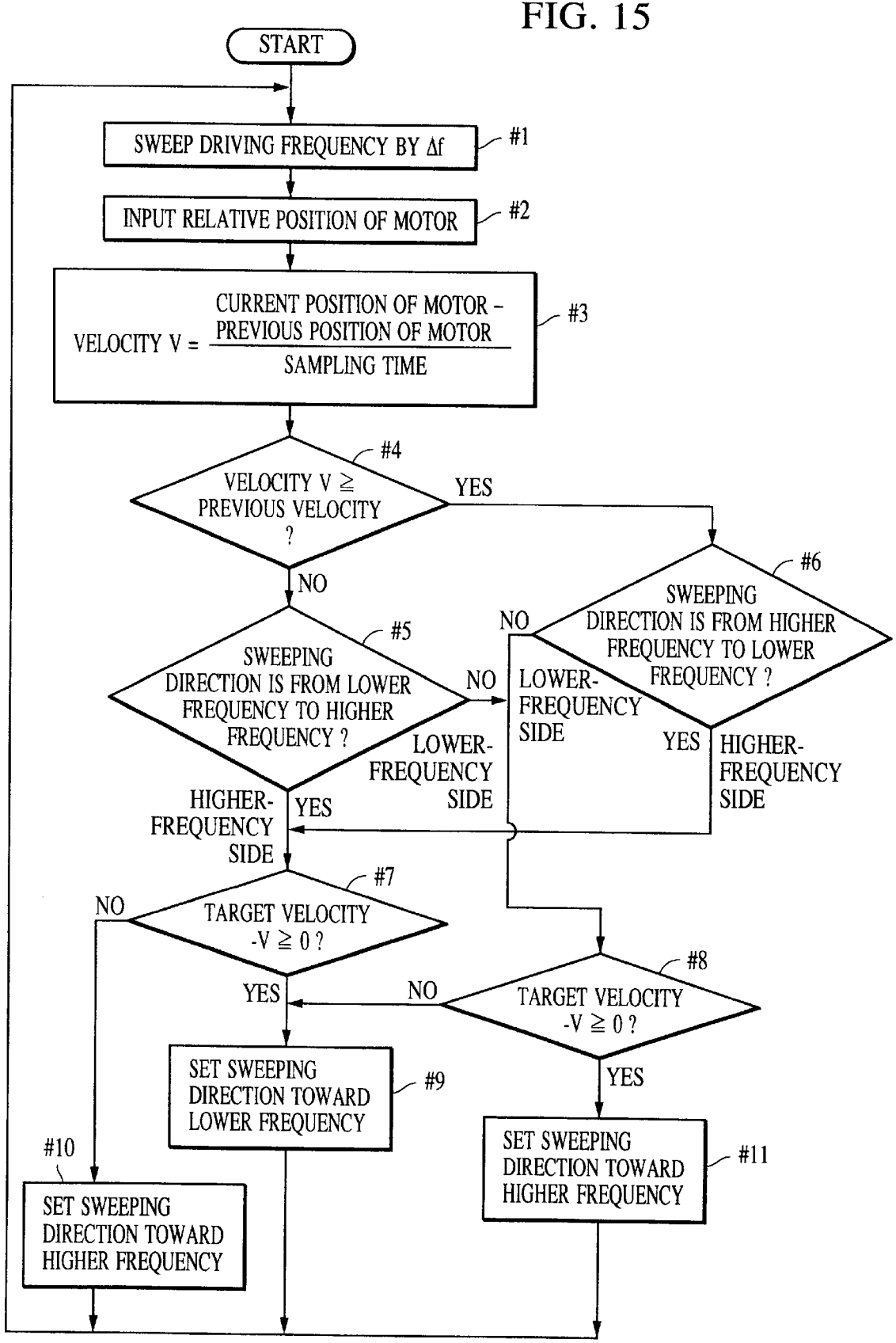
FIG. 15 is a flow chart illustrating an operation of the standing-wave vibration motor shown in FIG. 13.

FIG. 15 is a flow chart for performing the above operation. The drive frequency is swept in a predetermined direction by an amount of Δf (#1). Then, the relative position between the motor and the object output from the encoder 9 is input (#2) to calculate the current velocity from the previous position (#3). If the velocity calculated in #3 is higher than or equivalent to the previous velocity (#4), the flow proceeds to #6. Subsequently, it is determined in #6 whether the frequency has been swept from a higher frequency to a lower frequency. If the answer in #6 is yes, the flow proceeds to #7, and if not, the flow proceeds to #8. It is thus possible to judge whether the present frequency is positioned on the higher-frequency side or the lower-frequency side with respect to the thrust peak. If it has been found in #6 that the present frequency is positioned on the higher-frequency side, and if the current velocity is lower than or equivalent to the targeted velocity (#7), the flow proceeds to #9 in which the direction in which the frequency is swept (hereinafter referred to as "the frequency-sweeping direction") is set toward the lower frequency. In contrast, if it has been found in #6 that the present frequency is located on the lower-frequency side, and if the current velocity is lower than or equivalent to the targeted velocity (#8), the flow proceeds to #11 in which the frequency-sweeping direction is set toward the higher frequency. If the answer in #8 is no, the flow proceeds to #9 in which the frequency-sweeping direction is set toward the lower frequency.

The above-described operation can be repeated to control the velocity of the motor.

Figure 16:
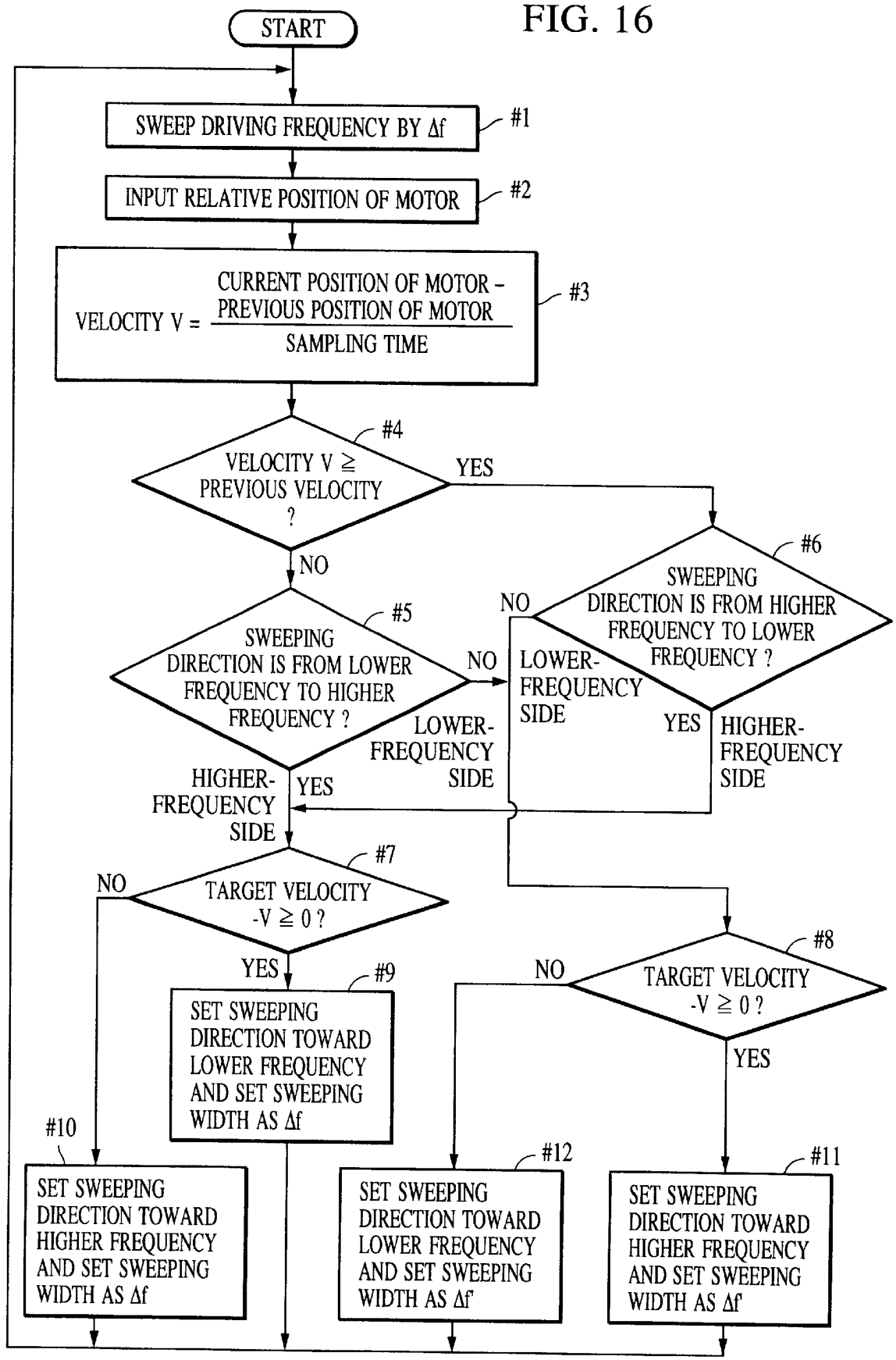
FIG. 16 is a flow chart illustrating another operation of the standing-wave vibration motor shown in FIG. 13.

FIG. 14 reveals that the thrust (velocity)-versus-frequency characteristics are angle-shaped with respect to the peak. This shape is not, however, exactly symmetrical about the peak, and the drive frequency range lower than the peak frequency is changed more sharply than that higher than the peak frequency. For enabling higher-precision control, it is necessary to differentiate the frequency-sweeping width on the higher-frequency side from that on the lower-frequency side. The control for performing this operation will now be explained with reference to the flow chart of FIG. 16.

The process steps #1 through #8 are similar to those of the flow chart of FIG. 15, and an explanation thereof will thus be omitted. An explanation will first be given of the case where it is found in #5 or #6 that the present frequency is positioned on the higher-frequency side. If it is found in #7 that the current velocity is lower than or equivalent to the targeted velocity, the flow proceeds to #9 in which the frequency-sweeping direction is set toward the lower frequency, and the sweeping width is determined to be Δf. In contrast, if it is found in #7 that the current velocity is higher than the targeted velocity, the flow proceeds to #10 in which the frequency-sweeping direction is set toward the higher frequency, and the sweeping width is determined to be Δf. An explanation will now be given of the case where it is found in #5 or #6 that the present frequency is located on the lower-frequency side. If it is found in #8 that the current velocity is lower than or equal to the targeted velocity, the flow proceeds to #11 in which the frequency-sweeping direction is set toward the higher frequency, and the sweeping width is determined as Δf'. In contrast, if the current velocity is higher than the targeted velocity, the flow proceeds to #12 in which the frequency-sweeping direction is set toward the higher frequency, and the sweeping width is determined as Δf'. It should be noted that the relationship Δf>Δf' holds true in this operation.

The aforedescribed operation can be repeated to control the velocity of the vibration motor with higher precision.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A vibration motor comprising:

an elastic member;

a plurality of electro-mechanical energy conversion element portions provided on said elastic member and;

a driving circuit that applies frequency signals to said plurality of electro-mechanical energy conversion element portions to excite a first standing wave vibration and a second standing wave vibration crossing the first standing wave vibration in said elastic member, thereby obtaining a driving force from a synthesized vibration of the first standing wave vibration and the second standing wave vibration, said driving circuit comprising at least one inductance element connected in series with electrodes for applying the frequency signals to said plurality of electro-mechanical energy conversion element portions, the inductance of said at least one inductance element being predetermined to satisfy the condition $-\pi/2 < d\theta(f) < \pi/2$, wherein $d\theta(f)$ is the phase difference between a phase $\theta_1(f)$ and a phase $\theta_2(f)$ of corresponding currents for the respective first standing wave vibration and second standing wave vibration relative to respective driving voltages in an equivalent circuit for said vibration motor.

2. A vibration motor comprising:

an elastic member;

a plurality of electro-mechanical energy conversion element portions provided on said elastic member; and a driving circuit that applies frequency signals to said plurality of electro-mechanical energy conversion element portions to excite a first standing wave vibration and a second standing wave vibration crossing the first standing wave vibration in said elastic member, thereby obtaining a driving force from a synthesized vibration of the first standing wave vibration and second standing wave vibration, said driving circuit comprising at least one inductance element connected in series with electrodes for applying the frequency signals to said plurality of electro-mechanical energy conversion element portions, the inductance of said at least one inductance element being predetermined to satisfy the condition $+a-\pi/2 < d\theta(f) < \pi/2+a$, where $d\theta(f)$ is phase difference between the first and second vibrations of said vibration motor so that the phase difference between a phase $\theta_1(f)$ and a phase $\theta_2(f)$ of corresponding currents for the respective first standing wave vibration and second standing wave vibration relative to respective driving voltages and "a" indicates the phase difference between the first standing wave vibration and the second standing wave vibration.

3. A vibration motor according to claim 1, wherein the first standing wave vibration is a bending vibration, and the second standing wave vibration is a longitudinal vibration.

4. A vibration motor according to claim 2, wherein the first standing wave vibration is a bending vibration, and the second standing wave vibration is a longitudinal vibration.

5. A vibration motor according to claim 3, wherein said plurality of electro-mechanical energy conversion element portions comprises first through fourth electro-mechanical energy conversion element portions, said first and second electro-mechanical energy conversion element portions being disposed on one surface of said elastic member, and said third and fourth electro-mechanical energy conversion element portions being disposed on the opposite surface of said elastic member, wherein said plurality of electro-mechanical energy conversion element portions are provided in such a manner that said first and third electro-mechanical energy conversion element portions face each other on opposite sides of said elastic member and said second and fourth electro-mechanical energy conversion element portions face each other on opposite sides of said elastic member, and said driving circuit applies a first frequency signal to said first and fourth electro-mechanical energy conversion element portions, and said drive circuit applies a second frequency signal out of phase with the first frequency signal to said second and third electro-mechanical energy conversion element portions.

6. A vibration motor according to claim 4, wherein said plurality of electro-mechanical energy conversion element portions comprises first through fourth electro-mechanical energy conversion element portions, said first and second electro-mechanical energy conversion element portions being disposed on one surface of said elastic member, and said third and fourth electro-mechanical energy conversion element portions being disposed on the opposite surface of said elastic member, wherein said plurality of electro-mechanical energy conversion element portions are provided in such a manner that said first and third electro-mechanical energy conversion element portions face each other on opposite sides of said elastic member and said second and fourth electro-mechanical energy conversion element portions face each other on opposite sides of said elastic member, said drive circuit applies a first frequency signal to said first and fourth electro-mechanical energy conversion element portions, and said drive circuit applies a second frequency signal out of phase with the first frequency signal to said second and third electro-mechanical energy conversion element portions.

7. A vibration motor according to claim 2, wherein the phase difference "a" between the first standing wave vibration and the second standing wave vibration is 90 degrees.

8. A vibration motor comprising;

an elastic member;

a plurality of electro-mechanical energy conversion element portions provided on said elastic member;

a drive circuit that applies frequency signals to said plurality of electro-mechanical energy conversion element portions to excite a first standing wave vibration and a second standing wave vibration crossing the first standing wave vibration in said elastic member, thereby obtaining a driving force from a synthesized vibration of the first standing wave vibration and the second standing wave vibration;

an inductance element connected in series with electrodes for applying the frequency signals to said plurality of electro-mechanical energy conversion element portions;

means for adjusting the frequencies of the frequency signals in frequency ranges which are respectively positioned on a higher frequency side and a lower frequency side with respect to a peak frequency corresponding to the peak of a thrust obtained by the synthesized vibration;

means for determining whether a present frequency of a frequency signal is in the higher-frequency range or the lower-frequency range with respect to the peak frequency, based on a direction in which the present frequency of the frequency signal is changed and based on a thrust change caused by the frequency change; and means for deciding, in accordance with a determination result by said determination means, a direction in which the present frequency is to be shifted.

9. A vibration motor according to claim 8, wherein said determination means determines that the present frequency is in the higher-frequency range when it determines that the thrust is increased when the frequency is lowered and when it determines that the thrust is decreased when the frequency is raised, and said determination means determines that the present frequency is in the lower-frequency range when it determines that the thrust is decreased when the frequency is lowered and when it determines that the thrust is increased when the frequency is raised.

10. A vibration motor according to claim 9, wherein said decision means decides that the present frequency is to be shifted to the lower frequency side in order to increase the thrust when said determination means determines that the present frequency is in the higher-frequency range, while said decision means decides that the present frequency is to be shifted to the higher frequency side in order to increase the thrust when said determination means determines that the present frequency is in the lower frequency range.

11. A vibration motor according to claim 8, further comprising setting means for setting a ratio by which the present frequency is to be shifted when said determination means determines that the present frequency is in the higher-frequency range larger than a ratio by which the present frequency is to be shifted when said determination means determines that the present frequency is in the lower-frequency range.

12. A vibration motor according to claim 8, wherein the inductance of said inductance element is predetermined to satisfy the condition $-\pi/2 < d\theta(f) < \pi/2$, where $d\theta(f)$ is the phase difference between a phase $\theta_1(f)$ and a phase $\theta_2(f)$ of corresponding currents for the respective first standing wave vibration and the second standing wave vibration relative to respective driving voltages in an equivalent circuit for said vibration motor.

13. A vibration motor comprising:

an electric member;

a plurality of electro-mechanical energy conversion element portions provided on the elastic member; and a driving circuit for applying frequency signals to said electro-mechanical energy conversion element portions to excite a first standing wave vibration and a second vibration crossing the first vibration in said elastic member, thereby obtaining a driving force from a synthesized vibration of the first standing wave vibration and the second standing wave vibration, said driving circuit comprising an inductance element connected in series with electrodes for applying the frequency signals to said electro-mechanical energy conversion element portions, the inductance of said inductance element being predetermined to satisfy the condition where a thrust direction of the vibration motor when the driving frequency is in a frequency range higher than a peak frequency corresponding to a peak thrust of the driving force is the same as the thrust direction in a frequency range lower than the peak frequency.

\* \* \* \* \*

UNITED STATES PATENT AND TRADEMARK OFFICE
CERTIFICATE OF CORRECTION

PATENT NO. : 5,955,819

DATED : September 21, 1999

INVENTOR(S): HIRONORI TAKANO, ET AL.

It is certified that error appears in the above-identified patent and that said Letters Patent is hereby corrected as shown below:

On the Title page,

At [75] Inventors:

"Yokohana" should read --Yokohama--.

Signed and Sealed this

Thirteenth Day of June, 2000

*Attest:*

Q. TODD DICKINSON

*Attesting Officer*     *Director of Patents and Trademarks*